United States Patent
Liu et al.

(10) Patent No.: US 11,144,594 B2
(45) Date of Patent: Oct. 12, 2021

(54) SEARCH METHOD, SEARCH APPARATUS AND NON-TEMPORARY COMPUTER-READABLE STORAGE MEDIUM FOR TEXT SEARCH

(71) Applicant: BEIJING SANKUAI ONLINE TECHNOLOGY CO., LTD, Beijing (CN)

(72) Inventors: Ming Liu, Beijing (CN); Dayao Chen, Beijing (CN); Mengmeng Pang, Beijing (CN); Tao Feng, Beijing (CN); Zhizhao Zeng, Beijing (CN); Yongchao Wei, Beijing (CN); Wenbin Pan, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 34 days.

(21) Appl. No.: 16/499,858

(22) PCT Filed: Dec. 12, 2017

(86) PCT No.: PCT/CN2017/115680
§ 371 (c)(1),
(2) Date: Sep. 30, 2019

(87) PCT Pub. No.: WO2018/176913
PCT Pub. Date: Oct. 4, 2018

(65) Prior Publication Data
US 2020/0110778 A1    Apr. 9, 2020

(30) Foreign Application Priority Data
Mar. 31, 2017   (CN) .................. 201710209677.X

(51) Int. Cl.
*G06F 16/903*   (2019.01)
*G06F 16/9032*  (2019.01)

(52) U.S. Cl.
CPC .. *G06F 16/90328* (2019.01); *G06F 16/90348* (2019.01)

(58) Field of Classification Search
None
See application file for complete search history.

(56) References Cited

U.S. PATENT DOCUMENTS 9,384,244 B1 * 7/2016 Garg ................. G06F 16/90324
2002/0059161 A1  5/2002 Li et al.
(Continued)

FOREIGN PATENT DOCUMENTS

CA    2437293 A1    8/2001
CN  102236663 A   11/2011
(Continued)

OTHER PUBLICATIONS

The State Intellectual Property Office of People's Republic of China, First Office Action in Patent Application No. 201710209677.X dated Mar. 4, 2019, which is a foreign counterpart application corresponding to this U.S. Patent Application, to which this application claims priority.
(Continued)

*Primary Examiner* — Son T Hoang
(74) *Attorney, Agent, or Firm* — Kolitch Romano LLP

(57) ABSTRACT

A search method includes: determining at least one first search policy matching a to-be-searched query text, where each first search policy corresponds to at least one first text index field and a search weight matching the first text index field; performing a search operation for the query text based on each first text index field corresponding to each first search policy and a search weight matching the first text
(Continued)

index field; and merging and outputting search results of all the search operations.

12 Claims, 5 Drawing Sheets

(56) References Cited

U.S. PATENT DOCUMENTS

| | | | |
|---|---|---|---|
| 2009/0138458 A1* | 5/2009 | Wanker | G06F 16/951 |
| 2013/0054569 A1 | 2/2013 | Mo et al. | |
| 2015/0088860 A1* | 3/2015 | Hamby | G06F 16/29 |
| | | | 707/722 |
| 2017/0068712 A1 | 3/2017 | Streufert et al. | |
| 2017/0161494 A1* | 6/2017 | Kern | G06F 21/552 |
| 2017/0193020 A1* | 7/2017 | Yi | G06F 16/2455 |
| 2017/0277802 A1 | 9/2017 | Sankar et al. | |

FOREIGN PATENT DOCUMENTS

| | | |
|---|---|---|
| CN | 102270222 A | 12/2011 |
| CN | 104063497 A | 9/2014 |
| CN | 104412265 A | 3/2015 |
| CN | 104462143 A | 3/2015 |
| CN | 105335391 A | 2/2016 |
| CN | 105488113 A | 4/2016 |
| CN | 105955991 A | 9/2016 |
| GB | 2449501 A | 11/2008 |
| JP | 2009043264 A | 2/2009 |
| JP | 2010237721 A | 10/2010 |
| JP | 2013525921 A | 6/2013 |
| JP | 2015106346 A | 6/2015 |
| WO | 2009107628 A1 | 6/2011 |

OTHER PUBLICATIONS

The State Intellectual Property Office of People's Republic of China, Second Office Action in Patent Application No. 201710209677.X dated May 17, 2019, which is a foreign counterpart application corresponding to this U.S. Patent Application, to which this application claims priority.

Notification to grant patent right for invention of Chinese Application No. 201710209677.X dated Jun. 28, 2019.

European Patent Office, Extended European Search Report pursuant to Rule 62 EPC, dated Oct. 6, 2020 in Patent Application No. 17903012.7, which is a foreign counterpart to this U.S. Application.

Search Report of Japanese Application No. 2020-502745 dated Jun. 17, 2021, which is a counterpart application corresponding to this U.S. application.

Notice of Reason for Refusal of Japanese Application No. 2020-502745 dated Jul. 6, 2021, which is a counterpart application corresponding to this U.S. application.

Takami, Shinya et al.; "Customizing Web Search Results by Dynamic Re-Generation of Web-Snippet Based on Search Purpose"; Jun. 25, 2007, vol. 107, No. 131, pp. 283-288.

* cited by examiner

SEARCH METHOD, SEARCH APPARATUS AND NON-TEMPORARY COMPUTER-READABLE STORAGE MEDIUM FOR TEXT SEARCH

CROSS-REFERENCE TO RELATED APPLICATIONS

This patent application is the U.S. national phase of International Application No. PCT/CN2017/115680, filed on Dec. 12, 2017. This international application claims priority to the Chinese patent application No. 201710209677.X, filed on Mar. 31, 2017 and entitled "SEARCH METHOD AND APPARATUS AND ELECTRONIC DEVICE", which is incorporated herein by reference in its entirety.

BACKGROUND

Technical Field

The present disclosure relates to the field of computer technologies, and specifically, to a search method, an apparatus and a non-temporary computer-readable storage medium.

Related Art

With the development of Internet technologies, information on the Internet is exploding, and more and more users obtain content of interest through information search on the Internet. For example, a search engine may be used to search for information based on text entered by a user and perform a search service based on a text correlation. At the early stage of development of search engines, web pages were also main information carriers on the Internet. Therefore, content of interest to the user can be basically obtained by searching a web page. However, with the development of mobile Internet, local life-oriented services provided by online-to-online (O2O) platforms have made people's lives easy, and search demands on the O2O platforms are gradually increasing. Unlike the web pages, an information description carrier on the O2O platform may have a plurality of text index fields for describing platform services from different perspectives. For example, points of interest (POI) of a merchant that provides catering services may be described from perspectives such as a merchant name, a merchant registered company name, a brand name, a business area of the merchant, a merchant address, merchant main dishes, and merchant business hours. In this case, there may be up to fifty or more descriptive text index fields on the O2O platform sometimes. In addition, information described in these text index fields may not be relevant, making it difficult to obtain comprehensive and accurate content of interest to users by searching for information in all the text index fields by using the web page search method.

SUMMARY

The present disclosure provides a search method, an apparatus and a non-temporary computer-readable storage medium.

According to a first aspect, an embodiment of the present disclosure provides a search method, including:

determining at least one first search policy matching a to-be-searched query text, where each first search policy corresponds to at least one first text index field and a search weight matching the first text index field;

performing a search operation for the query text based on each first text index field corresponding to each first search policy and a search weight matching the first text index field; and merging and outputting search results of all the search operations.

According to a second aspect, an embodiment of the disclosure provides a search apparatus, including a processor and a non-temporary computer-readable storage medium, where the non-temporary computer-readable storage medium stores a machine executable instruction executable by the processor, and the machine executable instruction causes the processor to perform the following operations: determining at least one first search policy matching a to-be-searched query text, wherein each first search policy corresponds to at least one first text index field and a search weight matching the first text index field; performing a search operation for the query text based on each first text index field corresponding to each first search policy and a search weight matching the first text index field; and merging and outputting search results of all the search operations.

According to a third aspect, an embodiment of the present disclosure provides a non-temporary computer-readable storage medium, storing a machine executable instruction, where when invoked and executed by a processor, and the machine executable instruction causes the processor to perform the search method disclosed in the first aspect of the present disclosure.

BRIEF DESCRIPTION OF THE DRAWINGS

To describe the technical solutions of the embodiment of the present disclosure more clearly, the following briefly describes the accompanying drawings required for describing the technology of the embodiments. The accompanying drawings in the following description merely show some embodiments of the present disclosure, and a person of ordinary skill in the art can derive other drawings from these accompanying drawings without creative efforts.

DETAILED DESCRIPTION

The following clearly and completely describes the technical solutions of the embodiments of the present disclosure with reference to the accompanying drawings. Apparently, the described embodiments are some embodiments rather than all the embodiments of the present disclosure. All other embodiments obtained by a person of ordinary skill in the art based on the embodiments of the disclosure without creative efforts shall fall within the protection scope of the disclosure.

Figure 1:
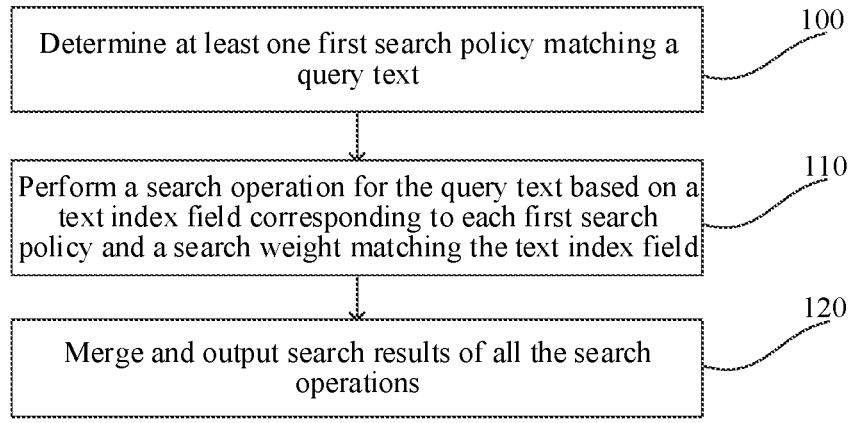
FIG. 1 is a flowchart of a search method according to an embodiment of the present disclosure.

An embodiment of the present disclosure discloses a search method. As shown in FIG. 1, the method includes step 100 to step 120.

The search method in the present disclosure may include two types of search policies, namely, a first search policy and a second search policy. The first search policy may perform a search operation on some text index fields in a search material. The second search policy may perform a search operation on all text index fields in the search material.

Step 100. Determine at least one first search policy matching a query text.

Each first search policy may correspond to at least one text index field and a search weight matching the text index field.

The first search policy may be used to limit a text index field of a to-be-queried search material and a search weight matching the text index field. Each first search policy may correspond to at least one text index field, and the text index fields may have the same or different search weights. The text index fields corresponding to each first search policy may correspond to the same or different query texts. The text index field may be used to create an index, for example, an inverted index. Content of the text index field is usually a meaningful text that can be used to describe an aspect of the search material. A merchant providing a catering service is used as an example. A point of interest (POI) of the search material may include at least one of fields such as a merchant name, a registered company name, a brand name, a business area, an address, main dishes, and business hours. These text fields are text index fields. For example, poi_name of a search material "Jinbaiwan Wangjing Garden Branch Store" may be Jinbaiwan Roast Duck Restaurant (Wangjing Garden Store). poi_name refers to a name of a text index field recorded in a system. For example, the name may be a merchant name "Jinbaiwan Roast Duck Restaurant". Text after poi_name is specific content of the text index field, and may be used to create an inverted index. The text index field may be used to represent a field of the search material. In this way, after a to-be-searched query text is obtained, a first search policy matching the query text may be first determined. For example, text index fields of a plurality of first search policies may be preset, and a query text corresponding to each first search policy is set. For example, the first search policies may include a merchant policy, a landmark policy, a dish name policy, and the like. Then, the query text corresponding to each first search policy may be set. For example, query texts corresponding to the merchant policy may include Jinbaiwan, KFC, Quanjude, and the like.

The to-be-searched query text may be entered by a user in a search bar of a client, or may be automatically generated by a client according to a historical behavior log of a user. For example, when detecting that a female user enters a cosmetics sales page, the client may push relevant search results to the user according to age information of the user. In this case, the client may first generate a query text (for example, a middle-aged female) according to user information, and then invoke a search engine to perform a search operation for the automatically generated query text.

When the at least one first search policy matching the query text is determined based on a corresponding relationship between query texts and first search policies, the corresponding relationship between query texts and first search policies may be established in advance manually. For example, a search policy corresponding to the query text "KFC" or "Jinbaiwan" may be set to be the merchant policy. When the corresponding relationship between query texts and first search policies is set, a text index field included in each first search policy and a search weight for each text index field may also be set. For example, the merchant policy may be set to include text index fields such as a merchant name, a brand name, and a registered company name. In addition, a search weight for each text index field corresponding to the merchant policy may be set as follows: A search weight for the merchant name is 50%. A search weight for the brand name is 30%. A search weight for the registered company name is 20%. The text index field corresponding to the first search policy and the search weight for each corresponding text index field may be set according to prior knowledge.

Determining at least one first search policy matching a to-be-searched query text may include: The at least one first search policy matching the query text may be determined according to a preset corresponding relationship between first search policies and query texts. Alternatively, the at least one first search policy matching the query text may be determined by identifying the query text by using a pretrained classifier. The first search policy may be manually established in advance, or may be determined through identification by using an identification model obtained through training according to user historical behaviors.

When the at least one first search policy matching the query text is determined by using the pretrained classifier, the classifier may be first trained according to a search log. For example, after search logs over a period of time are obtained, the obtained search logs may be clustered according to information such as query texts, text index fields, and matching texts in the search logs, to train the classifier for identifying a first search policy. The classifier obtained through training based on the search log may be used to determine the at least one first search policy matching the query text.

Step 110. Perform a search operation for the query text based on a text index field corresponding to each first search policy and a search weight matching the text index field.

One query text may correspond to a plurality of first search policies, and each first search policy may include a plurality of text index fields. After the first search policies matching the query text are determined, a search operation may be performed for the query text based on a text index field in each first search policy. For example, first search policies that may be determined according to the query text "Jinbaiwan" include a merchant policy and a landmark policy. In the merchant policy, text index fields matching the query text "Jinbaiwan" include a merchant name and a brand name. In the landmark policy, a text index field matching the query text "Jinbaiwan" includes a building. A search operation may be performed for the query text "Jinbaiwan" in the search material based on the three text index fields: the merchant name, the brand name, and the building, and three lists of search results may be obtained. When the search operation is performed for the query text in the search material based on different text index fields, a correlation between the query text and the search material may be calculated with reference to the search weight for each text index field.

To avoid missing a search result, the search operation may alternatively be performed based on the second search policy. The second search policy corresponds to all the text index fields. In this way, a second search result obtained by performing the search operation for the query text in all the text index fields based on the second search policy may be used as a supplement to a first search result obtained by performing the search operation for the query text in the corresponding to text index field based on the first search policy.

Step 120. Merge and output search results of all the search operations.

When the search results of all the search operations are merged and output, the search results may be sorted first, then duplicate search results are filtered out, and the remaining search results are output. When the search results are sorted, block-based ranking may be performed on the search results based on search policy priorities, or block-based ranking may be performed on the search results based on a discriminant score of each search policy; or mixed sorting may be performed on all the search results based on evaluation scores of the search results. If the performed search operation includes the search operation for the query text that is performed based on the second search policy, the second search result obtained by performing the search operation based on the second search policy may rank at the bottom.

According to the search method disclosed in this embodiment of the present disclosure, at least one first search policy matching a to-be-searched query text may be determined first. Each first search policy corresponds to at least one text index field, and each text index field has a preset search weight. Then, a search operation for the query text is performed based on the text index field corresponding to each first search policy and a search weight matching the text index field. Finally, search results of all the search operations are merged and output. In this way, even if a search material has information about a plurality of text index fields, a relatively accurate search result can be obtained. A search operation is performed in only a text index field associated with the query text and there is no need to search all the text index fields, so that incorrect recalling due to a literal hit on an irrelevant text index field can be avoided, thereby effectively improving a correlation of a search result. In addition, accuracy of the search result can be effectively improved by setting search weights for different text index fields.

Figure 2:
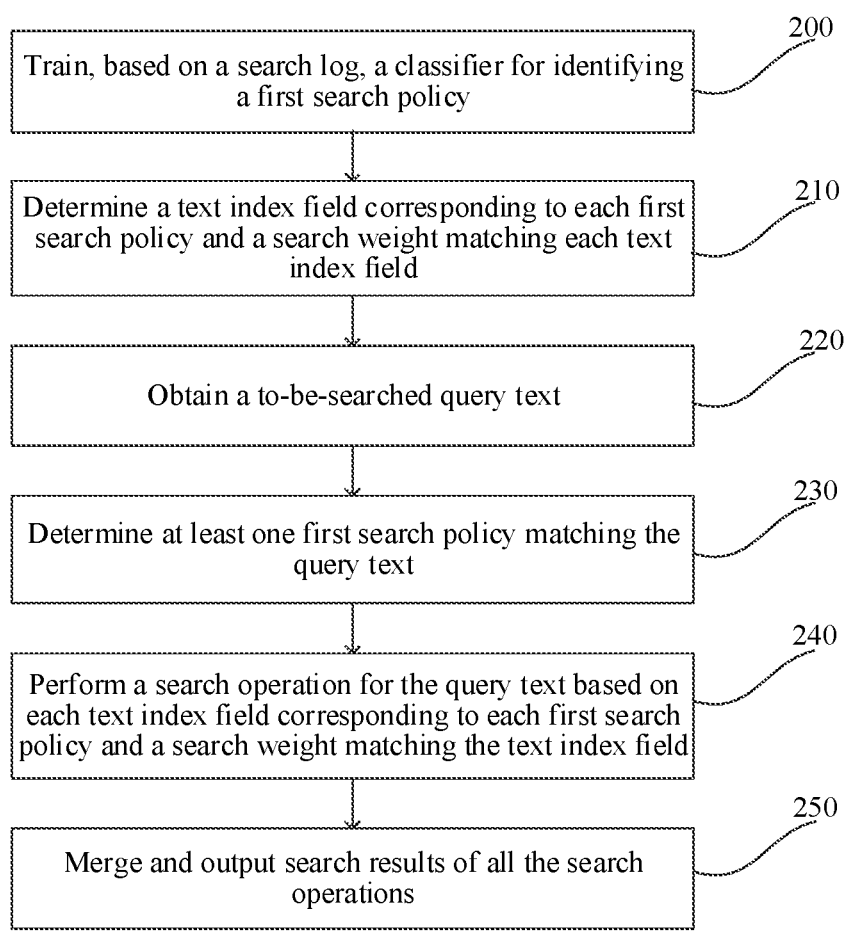
FIG. 2 is a flowchart of a search method according to another embodiment of the present disclosure.

An embodiment of the present disclosure discloses a search method. As shown in FIG. 2, the method includes step 200 to step 250.

Step 200. Train, based on a search log, a classifier for identifying a first search policy.

When the at least one first search policy matching the query text is determined by using the classifier, the classifier may be first trained according to the search log. The training, based on a search log, a classifier for identifying a first search policy may include: clustering the search log, and generating a search policy space definition, where the search policy space definition may be used to represent a mapping relationship between each first search policy and a query text in the search log; obtaining a search log corresponding to each first search policy based on the search policy space definition; and training, based on the search log corresponding to each first search policy, a classifier for identifying the corresponding first search policy.

The clustering the search log, and generating a search policy space definition may include: clustering the search log by using a hit score of a query text extracted according to each search log in the text index field as a feature, to obtain a query text category. Each query text category may correspond to one or more search policies.

Before the classifier is obtained through training, a search log of performing the search operation based on the second search policy may be obtained first. To make the classifier obtained through training more accurate, and to minimize a computational amount of training, search logs of order-placing behaviors may be selected for training the classifier. Search logs recorded in a search server vary in different systems. For example, the search log may include a search time, a query text, a matching text, a text index field, a result presentation list, an identifier of a behavior such as clicking or ordering, or the like. If the search logs of the order-placing behaviors account for a very low proportion in all the search logs, click logs and order-placing logs may be selected to jointly train the classifier. When the click logs and the order-placing logs are selected to jointly train the classifier, a behavior type weight of the click logs may be less than a behavior type weight of the order-placing logs.

A hit score of each text index field may be calculated based on the obtained search log. For example, a hit score $score_i$ of each text index field in the search log may be calculated by using the following formula 1:

$$score_i = \frac{len(match_i)}{min\{len(field_i), N\}} \times type_j. \quad \text{(formula 1)}$$

where $match_i$ represents a text matching a query text in an $i^{th}$ text index field when a search operation is performed for the query text, and $len(match_i)$ represents a length of the text matching the query text in the $i^{th}$ text index field. $field_i$ represents content of the $i^{th}$ text index field, and $len(field_i)$ represents a length of a text of the $i^{th}$ text index field. Usually, $len(match_i) \leq len(field_i)$. N is a smooth factor, and a denominator in the formula 1 represents that a smaller one of the length of the text in the text index field and a length limit N is used. The length limit N is used as an upper limit of the denominator, so that the entire score is not too small. $type_j$ represents a weight of a user behavior type corresponding to a current $j^{th}$ search log. For example, the behavior type weight type of the click log is equal to 0.8, and the behavior type weight type of the order-placing log is equal to 1. It can be learned that, based on each text index field in each log in which a click or order-placing behavior occurs, at least one non-zero value may be obtained as a hit score of the text index field in the log. N may be set to a natural number, such as 30, depending on a function of a search service.

A text index field vector is initialized, and dimensions of the vector are equal to a quantity of text index fields in the search log. For example, the search log includes M text index fields. In this case, the text index field vector may be a vector of M dimensions. The hit score $score_r$ of each text index field in each search log may be calculated by using the formula 1. In this way, a vector of M dimensions may be obtained for each search log. A plurality of vectors of M dimensions similar to [0, 0, 1.0, 0.8, 0, . . . , and 0] or [0, 0, 0.9, 0.9, 0, . . . , and 0] may be obtained for a plurality of search logs. M is the quantity of text index fields in the search log, a value of an $i^{th}$ dimension of each vector of M dimensions corresponds to the hit score of the $i^{th}$ text index field in each search log.

After a plurality of non-zero vectors of M dimensions are obtained according to a plurality of order-placing behavior logs and/or click behavior logs, the plurality of vectors of M dimensions are clustered, in other words, matching is performed on a type of searches with similar cases in the text index field and the searches are clustered into the same category, so that a mapping relationship between each first search policy and a query text in the search log can be established. In an embodiment, the obtained vectors of M dimensions may be clustered by using a numerical clustering method of multi-dimensional space, such as a density-based spatial clustering of applications with noise (Dbscan) clustering algorithm or a k-means clustering algorithm. A used clustering algorithm is not limited in the present disclosure.

After the clustering calculation, a center point of the clustering may be considered as a space definition of the first search policy. The space definition of the first search policy may be used to represent the mapping relationship between the first search policy and the query text in the search log, so that a specific category of query text may correspond to a specific first search policy. For example, when a user enters a query text such as "Jinbaiwan", "Haidilao", or "Jiutouying Jiujia", the user usually searches for the corresponding merchant. According to the foregoing clustering method, the query texts "Jinbaiwan", "Haidilao", and "Jiutouying Jiujia" are clustered as one type. As can be learned, the process of clustering according to the search log is actually a process in which supervised learning is performed on seemingly cluttered search results, and it is learned that searching in some text index fields by using a specific type of query text is more efficient than searching in all text index fields by using the specific type of query text. Clustering results usually should not be too fine, and it is better to control a quantity of the clustering results to be within a hundred. During use of an automatic clustering method, the first search policy corresponding to the query text can be determined and further the text index field corresponding to the first search policy can be determined, without paying attention to a specific meaning of the first search policy and without predefining the first search policy. This method can effectively reduce the possibility of errors in manually formulating policies and identify potential difficult-to-discover data laws.

Then, the classifier for identifying a first search policy may be trained based on each category of query texts.

In an embodiment, each category of query texts may be used as positive samples, and a specific quantity of negative samples are collected. The positive samples and the negative samples are used as training sample data for supervised learning, to train the classifier for identifying a first search policy. Each query text category may correspond to one first search policy. In an embodiment, there may be two manners to implement a multi-classifier: one manner is one multi-classifier; and the other is a fit of a plurality of binary classifiers. For example, a plurality of binary classifiers may be fitted in this embodiment. There may be a plurality of selections for classification models. In this embodiment, the training process of the classifier is described by the use of a support vector machine (SVM) classifier for supervised learning of training sample data as an example. First, sample features are extracted from the training sample data. The extracted sample features may include at least text features of the query text, for example, the query text and a word segmentation combination obtained after word segmentation is performed on the query text. The sample features extracted from the training sample data may further include: a query length, a prefix, a suffix, POS+bigram, POS+unigram, POS, and other combined features. The query length is a length of the query text, the prefix and the suffix are respectively a prefix and a suffix of the query text, unigram and bigram are text features of the query text, and POS+unigram is a position of the text feature of the query text.

The foregoing extracted sample features may be trained by using the SVM classifier, to obtain the classifier for identifying a first search policy. Any technology familiar to a person skilled in the art may be used to train the classifier based on the sample features. Details are not described herein.

After sample training, for each query text category, the corresponding classifier for identifying the first search policy may be obtained, to subsequently identify the obtained query text.

Step 210. Determine a text index field corresponding to each first search policy and a Search Weight Matching the Text Index Field.

There are two manners of determining the text index field corresponding to each first search policy and the search weight matching the text index field. In a first manner, if the first search policy is manually preset, a correspondence or a corresponding relationship between the text index field in the first search policy and the query text is also manually preset, and the search weight matching the text index field corresponding to each first search policy may also be manually preset. The text index field corresponding to each first search policy and the search weight matching each text index field may be manually preset in program code according to experience, or may be set by a user as required by providing a user interface. Details are not described herein.

In a second manner, the text index field of each first search policy and the search weight matching each text index field are set according to the search log. For example, all search logs corresponding to each first search policy may be obtained for the first search policy. Then, iterative calculation is performed on an average weight of each text index field corresponding to the first search policy according to a hit score of a query text in the search log corresponding to the first search policy in each text index field. The text index field corresponding to the first search policy and the search weight matching the text index field are determined according to the average weight of the text index field corresponding to the first search policy. The search log may be a search log obtained by performing the search operation on all the text index fields by using the second search policy. For example, the search log used when the space definition of the first search policy obtained through clustering may be indexed, to determine the search log corresponding to each first search policy.

The search log may alternatively be a search log obtained by performing the search operation on all the text index fields according to each first search policy by using an initialized search weight of the text index field. Using a search material including M text index fields as an example, it is assumed that each first search policy corresponds to the M text index fields, and a search weight matching each text index field is 1/M. Then the assumed first search policy is implemented, the search operation is performed for the query text according to the assumed first search policy, and search logs of the search operation within a period of time are obtained.

The search server may be used to obtain the search log corresponding to each first search policy, including obtaining a query text, a hit text, a text index field, a behavior type, and the like of each search log. The hit text is a matching text of the query text in the text index field. In an embodiment of the present disclosure, that the iterative calculation is performed on the search weight of each text index field corresponding to each first search policy according to the hit score of the query text in each search log corresponding to the first search policy in each text index field may include the following four steps.

Step 1. Obtain single log weights of all text index fields in each search log. Using the search material including M text index fields as an example, each search log matches at least one text index field. Before the hit score is calculated, search weights of the M text index fields may be separately initialized to 1/M. Then, a single log weight of each text index field in each search log may be calculated by using the following formula 2:

$$weight_i = \frac{len(match_i)}{\log(len(field_i)) + 1} \times type_j. \quad \text{(formula 2)}$$

$type_j$ is a behavior type weight of an $j^{th}$ search log. For example, if the $j^{th}$ search log is a click log, $type_j$ is equal to 0.8, or if the $j^{th}$ search log is an order-placing log, $type_j$ is equal to 1. $type_j$ may alternatively be another value, provided that a behavior type weight of a click log is less than a behavior type weight of an order-placing log. $field_i$ represents content of an $i^{th}$ text index field, and $len(field_i)$ represents a length of the content of the $i^{th}$ text index field. match represents matching content of a query text of the $j^{th}$ search log in the $i^{th}$ text index field, and may be obtained in a search process. The single log weight of each text index field in each search log may alternatively be calculated by using another formula. In this embodiment, an exponent proportion is used to control an upper limit of the single log weight, to obtain a smooth upper limit.

The single log weights of all the text index fields in each search log may be obtained by using the foregoing formula 2. For example, it is assumed that there are Y order-placing logs in total, and each order-placing log has M text index fields. In this case, after single log weights of all the M text index fields in the Y order-placing logs are separately obtained by using the formula 2, each text index field corresponds to Y single log weights.

Because each first search policy may correspond to at least one text index field, each text index field may correspond to a plurality of first search policies. For example, a merchant policy may correspond to three text index fields: a merchant name, an address, and a merchant brand, and a landmark policy may correspond to two text index fields: a merchant name and an address. All search logs corresponding to each first search policy may be separately calculated by using the foregoing formula 2, to obtain the single log weights of all the text index fields in each search log corresponding to each first search policy.

Step 2. Calculate the average weight of each text index field corresponding to each first search policy based on the single log weights of all the text index fields in each search log corresponding to the first search policy. For example, an average value may be calculated for a single log weight of each text index field in each search log corresponding to each first search policy based on a formula 3 below, to obtain an average weight of each text index field corresponding to the first search policy. The formula 3 is as follows:

$$weight\_avg_i = \frac{\sum weight_i}{count_i + 1}. \quad \text{(formula 3)}$$

where $weight_i$ is a single log weight of the $i^{th}$ text index field in a search log corresponding to a first search policy, $count_i$ is a quantity of non-zero single log weights of the $i^{th}$ text index field in all the search logs corresponding to the first search policy, and $weight\_avg_i$ represents the average weight of the $i^{th}$ text index field corresponding to the first search policy.

In one example of obtaining of P first search policies (for example, the number of the first search policies is P and the P first search policies may be separately denoted as G1, G2, . . . , and Gp) through clustering, it is assumed that the first search policy G1 corresponds to three text index fields, which may be separately denoted as T1, T2, and T3. An average weight $weight\_avg_1$ of the text index field T1 corresponding to the first search policy G1, an average weight $weight\_avg_2$ of the text index field T2 corresponding to the first search policy G1, and an average weight $weight\_avg_3$ of the text index field T3 corresponding to the first search policy G1 are calculated.

Step 3. Obtain a normalized weight value of the average weight of each text index field corresponding to each first search policy.

Average weights of the M text index fields corresponding to each first search policy may be obtained through calculation in the foregoing two steps, some are non-zero average weights, and the remaining average weights are equal to zero. The non-zero average weights may be normalized by using a formula 4 below, to obtain the normalized weight value of the average weights. The formula 4 is as follows:

$$weight'_i = \frac{weight\_avg_i}{\sum_{j=1}^{N} weight\_avg_j}. \quad \text{(formula 4)}$$

where $weight\_avg_j$ is a non-zero average weight of an $j^{th}$ text index field corresponding to a first search policy, $weight'_i$ is a normalized weight value of an $i^{th}$ text index field corresponding to the first search policy, and N is a quantity of non-zero average weights. For example, the average weight $weight\_avg_1$ of the text index field T1 corresponding to the first search policy G1, the average weight $weight\_avg_2$ of the text index field T2 corresponding to the first search policy G1, and the average weight $weight\_avg_3$ of the text index field T3 corresponding to the first search policy G1 are normalized, to obtain normalized weight values $weight'_1$, $weight'_2$, and $weight'_3$ of all the text index fields T1, T2, and T3 that correspond to the first search policy G1. After the normalization, a sum of weights of all the text index fields corresponding to each first search policy is 1.

Step 4. Determine a text index field with a non-zero normalized weight value as a text index field corresponding to each first search policy. The non-zero normalized weight value is a search weight of the text index field in the first search policy.

After the foregoing iterative calculation, a plurality of text index fields with non-zero normalized weight values are determined for each first search policy, so that a text index field in which a user is interested may be selected from the search material, and a normalized weight value of the text index field may be used as a search weight for calculating a correlation of the search material.

An obtained non-zero normalized weight value of the text index field corresponding to each first search policy may be too small. To avoid noise, a threshold may be set to remove the non-zero normalized weight value that is too small. The iterative calculation the search weight of each text index field corresponding to the first search policy according to the hit score of the query text in each search log corresponding to the first search policy in each text index field may further include: determining a text index field whose normalized weight value is greater than a preset threshold as the text index field corresponding to each first search policy. The preset threshold may be 1/the quantity of non-zero normalized weight values.

During identification of the first search policy, an entire query text may be input into the trained classifier, to obtain a result indicating whether the query text is appropriate for the current first search policy.

Step 220. Obtain a to-be-searched query text.

The to-be-searched query text may be a query text entered by a user in a search bar of a client, or may be a query text automatically generated by a client according to a historical behavior log of a user. For example, after the client detects that a female user enters a cosmetics sales page, the client may push relevant search results to the user according to age information of the user. In this case, the client first generates a query text (for example, a middle-aged female) according to user information, and then invokes a search engine to perform a search operation for the automatically generated query text.

Step 230. Determine at least one first search policy matching the query text.

Each first search policy corresponds to at least one text index field and a search weight matching the text index field.

Determining at least one first search policy matching the query text may include: determining the at least one first search policy matching the query text according to a preset correspondence between first search policies and query texts; or determining the at least one first search policy matching the query text by identifying the query text by using a pretrained classifier. When the at least one first search policy matching the query text is determined by identifying the query text by using the pretrained classifier, the query text may be separately input into a plurality of pretrained classifiers, to obtain an identification result of each classifier. When identification by a classifier or some classifiers is applicable to the query text, a first search policy corresponding to the classifier or the classifiers are used as a first search policy matching the query text.

Step 240. Perform a search operation for the query text based on each text index field corresponding to each first search policy and a search weight matching the text index field.

One query text may be identified as matching one or more first search policies, and each first search policy corresponds to a respective text index field and search weight. The search server may separately perform the search operation according to the plurality of first search policies, to obtain a recall result set corresponding to each first search policy.

Performing a search operation for the query text based on each text index field corresponding to each first search policy includes: performing material recall according to a correlation between a text index field in a search material and the query text. The correlation may be determined based on the search weight for the text index field. The search server may perform the search operation in parallel based on a plurality of first search policies by using a multithreading technology, to obtain the recall result set corresponding to each first search policy. Each first search policy corresponds to its respective text index field and search weight. Therefore, a more important text index field may be enabled to obtain a higher correlation score by calculating a correlation score between the search material and the query text, so that a recall result sorting effect of the entire search server can be effectively improved.

For example, it is assumed that the search server may use a linear correlation weighted score as the correlation score based on a formula 5 below. The formula 5 is as follows:

Correlation score=Σ(Text index field matching length/Text index field length)×Search weight (formula 5).

For example, a merchant "KFC" corresponds to two text index fields: the first text index field is a "merchant name", and a corresponding query text is "KFC"; and the second text index field is a "location", and a corresponding query text is "west side of Wudaokou subway station". A merchant "Pizza Hut" may correspond to two same text index fields: the first text index field is a "merchant name", and a corresponding query text is "Pizza Hut"; and the second text index field is a "location", and a corresponding query text is "east side of KFC Wudaokou Store". When the query text is "KFC", if a search weight of a text index field corresponding to the "merchant name" is larger, a correlation score of the merchant "KFC" is higher than that of the merchant "Pizza Hut".

Step 250. Merge and output search results of all the search operations.

Merging and outputting search results of all the search operations may include: sorting the search results based on the at least one first search policy according to a preset policy; filtering out duplicate search results ranking lower; and outputting the remaining search results. When the search results of all the search operations are merged and output, the search results may be first sorted according to the preset policy. When the search results are sorted, block-based ranking may be performed, according to manually set priorities, on the search results obtained by performing the search operation based on a plurality of first search policies; or block-based ranking may be performed according to correlation scores of the search results obtained by performing the search operation based on each first search policy; or mixed sorting may be performed, according to correlation scores of the search results, on the search results obtained for all the first search policies. Then, duplicate search results ranking lower are filtered out, and the remaining search results are output.

In the search method disclosed in this embodiment of the present disclosure, a classifier for identifying a first search policy may be trained based on a search log, and a text index field corresponding to each first search policy and a search weight matching each text index field may be determined. In this way, in a search process, at least one first search policy matching an obtained to-be-searched query text may be determined according to the query text, and after a search operation is separately performed for the query text based on the text index field corresponding to each first search policy, search results of all the search operations are merged and output. The search operation is performed in a text index field associated with the query text, so that the same query text is used for searching only in the corresponding text index field and there is no need to search all text index fields, thereby avoiding incorrect recalling due to a literal hit on an irrelevant text index field, and effectively improving a correlation of a search result with information about a plurality of text index fields. In addition, accuracy of the search results can be effectively improved by optimizing rankings of the search results by using search weights that are matched based on different text field indexes.

The classifier for identifying a first search policy is trained based on the search log, and iterative calculation is performed based on the search log to determine the text index field corresponding to the first search policy and the search weight matching each text index field, so that a search expectation of a user can be fully reflected, thereby further effectively improving the accuracy of the search results.

Figure 3:
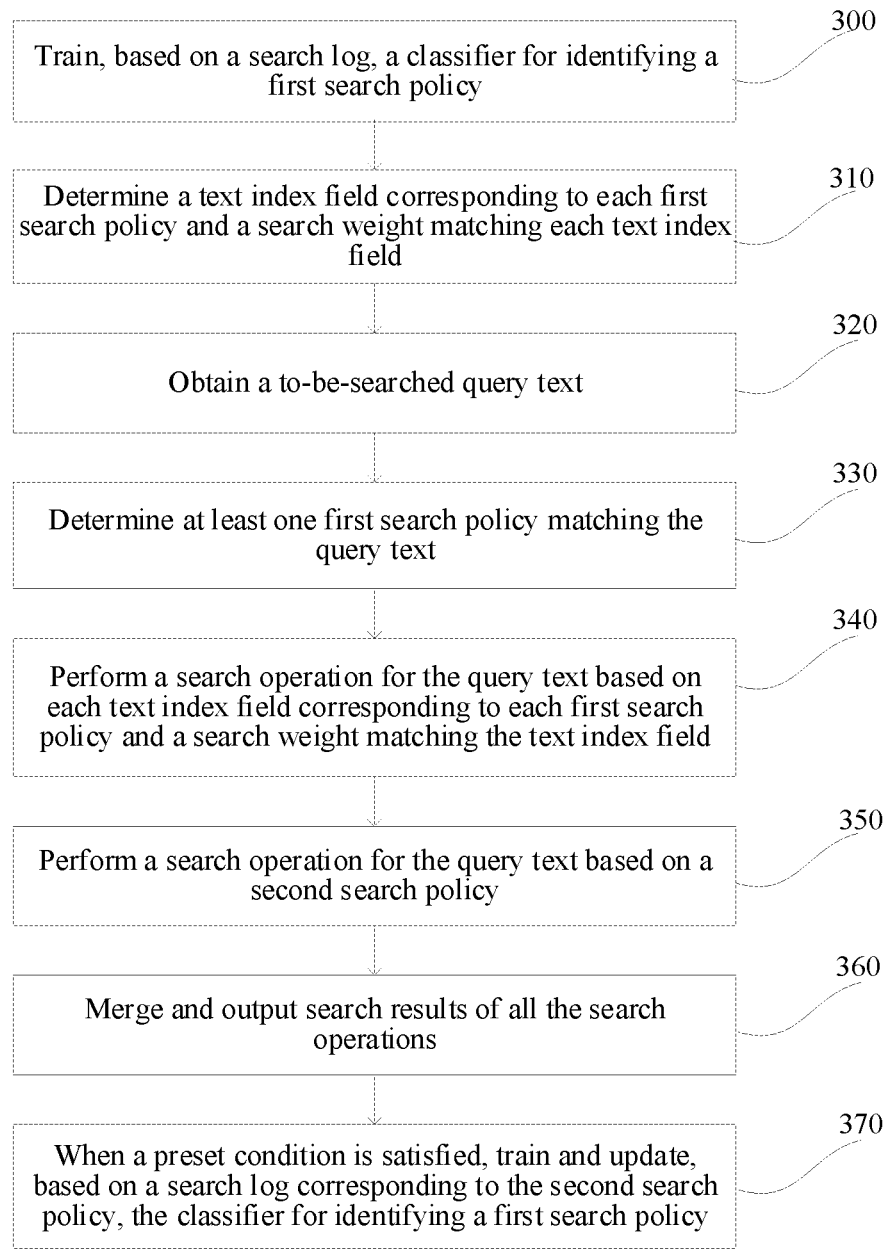
FIG. 3 is a flowchart of a search method according to still another embodiment of the present disclosure.

An embodiment of the present disclosure discloses a search method. As shown in FIG. 3, the method may include step 300 to step 370.

Step 300. Train, based on a search log, a classifier for identifying a first search policy.

For a specific implementation of training, based on the search log, the classifier for identifying a first search policy, refer to the foregoing embodiment. Details are not described herein again.

Step 310. Determine a text index field corresponding to each first search policy and a search weight matching each text index field.

For a specific implementation of determining a text index field corresponding to each first search policy and a search weight matching each text index field, refer to the foregoing embodiment. Details are not described herein again.

Step 320. Obtain a to-be-searched query text.

For a specific implementation of obtaining a to-be-searched query text, refer to the foregoing embodiment. Details are not described herein again.

Step 330. Determine at least one first search policy matching the query text.

Each first search policy may correspond to at least one text index field and a search weight matching the text index field.

For a specific implementation of determining at least one first search policy matching the query text, refer to the foregoing embodiment. Details are not described herein again.

Step 340. Perform a search operation for the query text based on each text index field corresponding to each first search policy and a search weight matching the text index field.

For a specific implementation of performing a search operation for the query text based on each text index field corresponding to the at least one first search policy, refer to the foregoing embodiment. Details are not described herein again.

Step 350. Perform the search operation for the query text based on a second search policy.

The second search policy corresponds to all text index fields of a search material, and search weights of all the text index fields are the same.

To increase system robustness, the search operation for the query text may further be performed on all the text index fields based on the second search policy. In sorting, a search result corresponding to the second search policy is placed after a search result corresponding to the first search policy, to avoid recalling when there is no result.

Step 360. Merge and output search results of all the search operations.

Merging and outputting search results of all the search operations may include: sorting, according to a preset policy, search results of all search operations performed based on the first search policy; placing a search result obtained by performing the search operation based on the second search policy after a search result obtained by performing the search operation based on the first search policy; filtering out duplicate search results ranking lower; and outputting the remaining search results. For a specific method for sorting search results obtained by performing the search operation based on the first search policy, refer to the foregoing embodiment. Details are not described herein again. Then, duplicate search results ranking lower are filtered out, and the remaining search results are output.

Step 370. When a preset condition is satisfied, train and update, based on a search log corresponding to the second search policy, the classifier for identifying a first search policy.

As use habits of a user change or search materials constantly increase, the first search policy may not be capable of meeting a user search requirement. In this case, the user may frequently select a search result returned after performing the search operation based on the second search policy. In this case, the first search policy needs to be updated based on a selection behavior log of the user for the presented search result. The preset condition may include at least one of the following: a preset update period is reached, and a ratio of a first click-through rate to a second click-through rate is less than a preset threshold. The first click-through rate is a click-through rate of a search result obtained by performing a search operation based on the first search policy, and the second click-through rate is a click-through rate of a search result obtained by performing a search operation based on the second search policy.

The preset update period may be determined according to an update speed of the search material or may be manually set, for example, may be determined as one month. The first click-through rate of the user for the search result obtained by performing the search operation based on the first search policy, and the second click-through rate of the user for the search result obtained by performing the search operation based on the second search policy may be obtained through statistical analysis of a search log of a search server.

When the preset update period is reached, or the ratio of the first click-through rate to the second click-through rate is less than the preset threshold, step 300 and step 310 may be performed based on the search log obtained by performing the search operation based on the second search policy, the operation of training the classifier for identifying a first search policy and determining the text index field corresponding to the first search policy and the search weight matching the text index field is repeatedly performed based on the search log, and the classifier obtained through training and the first search policy are supplemented to the original first search policy.

Performing the search operation with reference to the second search policy can avoid recalling when there is no result due to missed detection. In addition, by repeatedly performing, with reference to the search result corresponding to the second search policy, the operation of training the classifier for identifying a first search policy, the problem that the first search policy is no longer appropriate due to a change in use habits of a user, and a new first search policy can be found in a timely manner.

Figure 4:
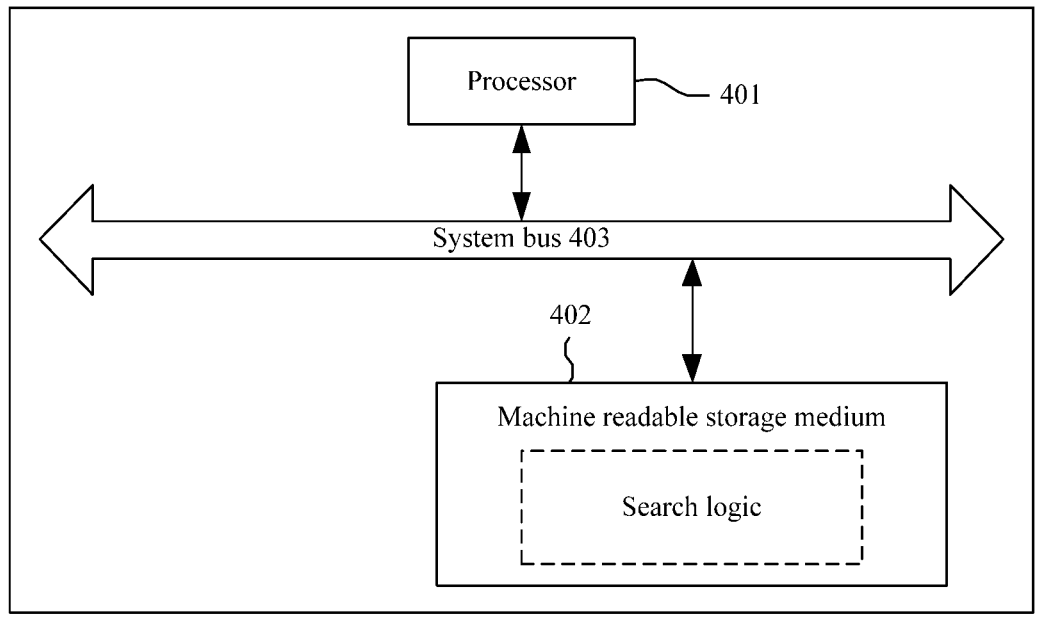
FIG. 4 is a schematic diagram of a hardware structure of a search apparatus according to an embodiment of the present disclosure.

Corresponding to the foregoing search method, an embodiment of the present disclosure further provides a search apparatus. FIG. 4 is a schematic diagram of a hardware structured of a search apparatus. The search apparatus may include a processor 401 and a non-temporary computer-readable storage medium 402 storing a machine executable instruction. The processor 401 may communicate with the non-temporary computer-readable storage medium 402 through a system bus 403. In addition, by reading and executing the machine executable instruction corresponding to search logic in the non-temporary computer-readable storage medium 402, the processor 401 may perform the following operations: determining at least one first search policy matching a to-be-searched query text, where each first search policy corresponds to at least one first text index field and a search weight matching the first text index field; performing a search operation for the query text based on each first text index field corresponding to each first search policy and a search weight matching the first text index field; and merging and outputting search results of all the search operations.

In a possible implementation, the machine executable instruction further causes the processor to perform the following operation: determining the at least one first search policy matching the query text according to a preset correspondence between first search policies and query texts.

In another possible implementation, the machine executable instruction further causes the processor to perform the following operation: determining the at least one first search policy matching the query text by identifying the query text by using a classifier pretrained for identifying each first search policy.

In another possible implementation, the machine executable instruction further causes the processor to perform the following operation: training the classifier based on a search log.

In another possible implementation, the machine executable instruction further causes the processor to perform the following operations: clustering the search log, and generating a search policy space definition, where the search policy space definition is used to represent a mapping relationship between each first search policy and a query text in the search log; obtaining a search log corresponding to each first search policy based on the search policy space definition; and training, based on the search log corresponding to each first search policy, a classifier for identifying the corresponding first search policy.

In another possible implementation, the machine executable instruction further causes the processor to perform the following operation: determining the at least one first text index field corresponding to each first search policy and a search weight matching the first text index field.

In another possible implementation, the machine executable instruction further causes the processor to perform the following operations: obtaining a search log corresponding to the first search policy; performing iterative calculation on an average weight of each second text index field corresponding to the first search policy according to a hit score of a query text in the search log corresponding to the first search policy in the second text index field in a search material; and determining the first text index field corresponding to the first search policy and the search weight matching the first text index field according to the average weight of the second text index field corresponding to the first search policy.

In another possible implementation, the machine executable instruction further causes the processor to perform the following operations: obtaining a single log weight of each second text index field in each search log corresponding to the first search policy; and calculating the average weight of each second text index field corresponding to the first search policy based on the single log weight of the second text index field in each search log corresponding to the first search policy.

In another possible implementation, the machine executable instruction further causes the processor to perform the following operations: calculating a normalized weight value of each second text index field corresponding to the first search policy based on the average weight of the second text index field corresponding to the first search policy; determining the second text index field corresponding to the normalized weight value greater than a preset threshold as the first text index field corresponding to the first search policy; and determining the normalized weight value corresponding to the first text index field as the search weight matching the first text index field.

In another possible implementation, the machine executable instruction further causes the processor to perform the following operation: performing material recalling according to a correlation between content of each first text index field in a search material and the query text, where the correlation is determined based on the search weight of the first text index field.

In another possible implementation, the machine executable instruction further causes the processor to perform the following operation: performing the search operation for the query text based on a second search policy, where the second search policy corresponds to all second text index fields of a search material, and search weights of all the second text index fields are the same.

In another possible implementation, the machine executable instruction further causes the processor to perform the following operation: when a preset condition is satisfied, training and updating, based on a search log corresponding to the second search policy, a classifier for identifying the first search policy.

In another possible implementation, the machine executable instruction further causes the processor to perform the following operations: the preset condition comprises at least one of the following: a preset update period is reached; and a ratio of a first click-through rate to a second click-through rate is less than a preset threshold, where the first click-through rate is a click-through rate of a search result obtained by performing a search operation based on the first search policy, and the second click-through rate is a click-through rate of a search result obtained by performing a search operation based on the second search policy.

The search apparatus may be a PC, a mobile terminal, a personal digital assistant, a tablet computer, or the like.

The non-temporary computer-readable storage medium 402 mentioned in this specification may be any electronic, magnetic, optical, or other physical storage apparatus, and may include or store information, such as an executable instruction or data. For example, the non-temporary computer-readable storage medium may be a random-access memory (RAM), a volatile memory, a non-volatile memory, a flash memory, a storage drive (such as a hard disk drive), a solid-state drive, any type of storage disk (such as a compact disc or a DVD), a similar storage medium, or a combination thereof.

Figure 5:
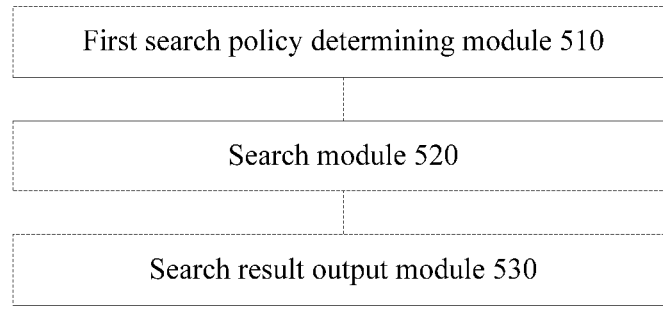
FIG. 5 is a functional block diagram of search logic according to an embodiment of the present disclosure.

FIG. 5 is a functional block diagram of search logic according to an embodiment of the present disclosure. As shown in FIG. 5, in terms of functional division, the search logic may include a first search policy determining module 510, a search module 520, and a search result output module 530.

The first search policy determining module 510 is configured to determine at least one first search policy matching a to-be-searched query text, where each first search policy corresponds to at least one first text index field and a search weight matching the first text index field.

The search module 520 is configured to perform a search operation for the query text based on each first text index field corresponding to each first search policy determined by the first search policy determining module 510 and a search weight matching the text index field.

The search result output module 530 is configured to merge and output search results of all the search operations.

In the search apparatus disclosed in this embodiment of the present disclosure, at least one first search policy matching a query text is determined, where each first search policy corresponds to at least one first text index field and a search weight matching the first text index field; then, a search operation for the query text is performed based on each text index field corresponding to each first search policy and a search weight matching the text index field; and finally, search results of all the search operations are merged and output. In this way, a relatively accurate search result may be obtained for information having a plurality of text index fields. A search operation is performed in only a text index field associated with the query text and there is no need to search all the text index fields, so that incorrect recalling due to a literal hit on an irrelevant text index field can be avoided, thereby effectively improving a correlation of a search result. In addition, accuracy of the search result can be effectively improved by setting matching search weights for different text field indexes.

Figure 6:
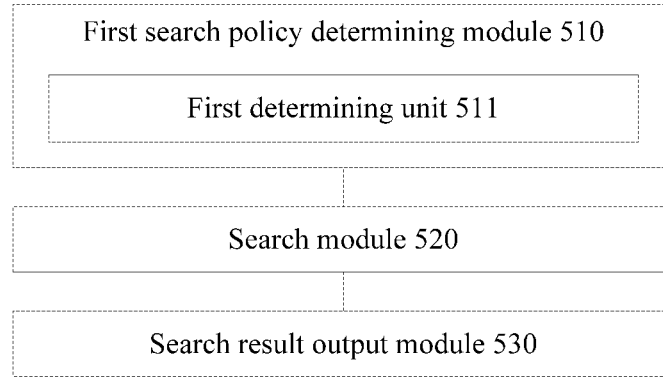
FIG. 6 is a functional block diagram of search logic according to another embodiment of the present disclosure.

In an embodiment, as shown in FIG. 6, the first search policy determining module 510 includes:

a first determining unit 511, configured to determine the at least one first search policy matching the query text according to a preset corresponding relationship between first search policies and query texts.

Figure 7:
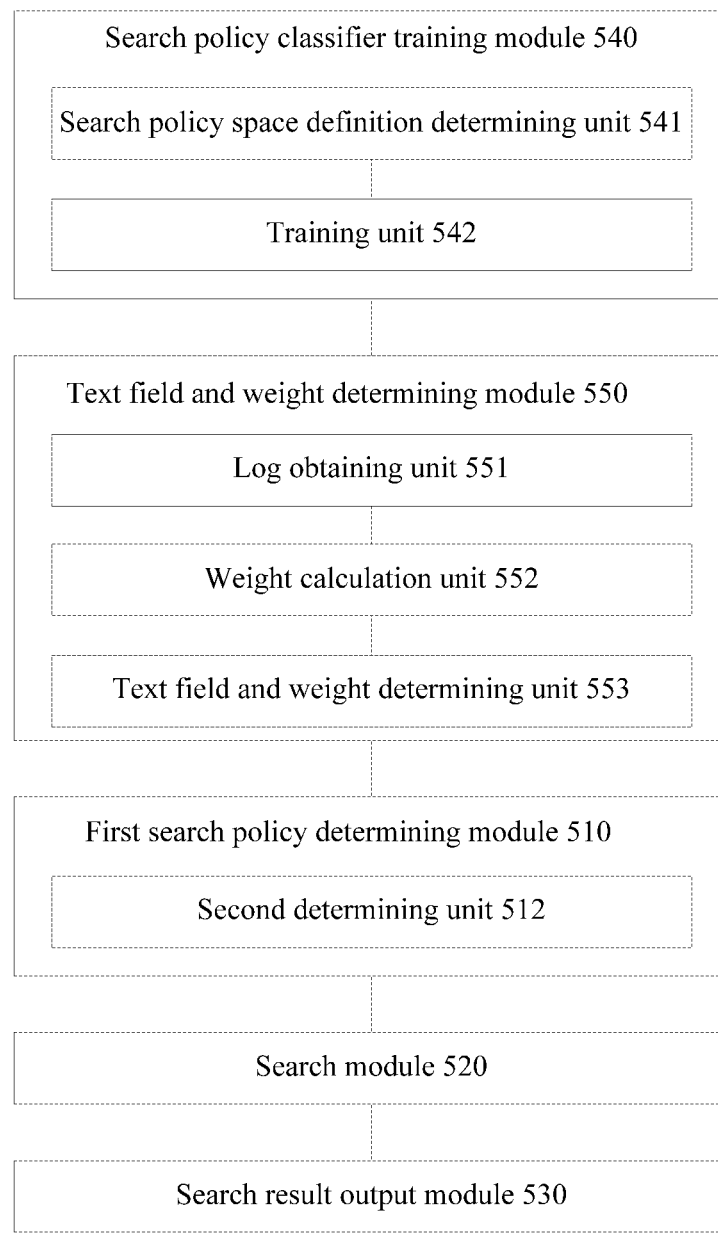
FIG. 7 is a functional block diagram of search logic according to still another embodiment of the present disclosure.

In another embodiment, as shown in FIG. 7, the first search policy determining module 510 includes:

a second determining unit 512, configured to determine the at least one first search policy matching the query text by identifying the query text by using a classifier pretrained for identifying each first search policy.

In an embodiment, if the second determining unit 512 is used to determine the at least one first search policy matching the query text, as shown in FIG. 7, the search logic further includes:

a search policy classifier training module 540, configured to train the classifier based on a search log.

In an embodiment, if the second determining unit 512 is used to determine the at least one first search policy matching the query text, as shown in FIG. 7, the search logic further includes:

a text field and weight determining module 550, configured to determine the first text index field corresponding to each first search policy and a search weight matching the first text index field.

In an embodiment, as shown in FIG. 7, the search policy classifier training module 540 includes:

a search policy space definition determining unit 541, configured to cluster the search log, and generate a search policy space definition, where the search policy space definition is used to represent a mapping relationship between each first search policy and a query text in the search log; and a training unit 542, configured to obtain a search log corresponding to each first search policy based on the search policy space definition; and train, based on the search log corresponding to each first search policy, a classifier for identifying the corresponding first search policy.

In an embodiment, as shown in FIG. 7, the text field and weight determining module 550 includes a log obtaining unit 551, a weight calculation unit 552, and a text field and weight determining unit 553.

The log obtaining unit 551 is configured to obtain a search log corresponding to the first search policy.

The weight calculation unit 552 is configured to perform iterative calculation on an average weight of each second text index field corresponding to the first search policy according to a hit score of a query text in the search log corresponding to the first search policy in the second text index field in a search material. In an embodiment, the weight calculation unit 552 may be further configured to obtain a single log weight of each second text index field in each search log corresponding to the first search policy; and calculate the average weight of each second text index field corresponding to the first search policy based on the single log weight of the second text index field in each search log corresponding to the first search policy.

The text field and weight determining unit 553 is configured to determine the first text index field corresponding to the first search policy and the search weight matching the first text index field according to the average weight of the second text index field corresponding to the first search policy. In an embodiment, the text field and weight determining unit 553 may be further configured to: calculate a normalized weight value of each second text index field corresponding to the first search policy based on the average weight of the second text index field corresponding to the first search policy; determine the second text index field corresponding to the normalized weight value greater than a preset threshold as the first text index field corresponding to the first search policy; and determine the normalized weight value corresponding to the first text index field as the search weight matching the first text index field.

The first search policy and the classifier of the first search policy are trained based on the search log, and iterative calculation is performed based on the search log to determine the text index field corresponding to the first search policy and the search weight matching each text index field, so that a search expectation of a user can be fully reflected, thereby effectively improving the accuracy of the search result.

In an embodiment, the search module 510 is specifically configured to:

perform material recalling according to a correlation between content of each first text index field in a search material and the query text, where the correlation is determined based on the search weight of the first text index field.

Figure 8:
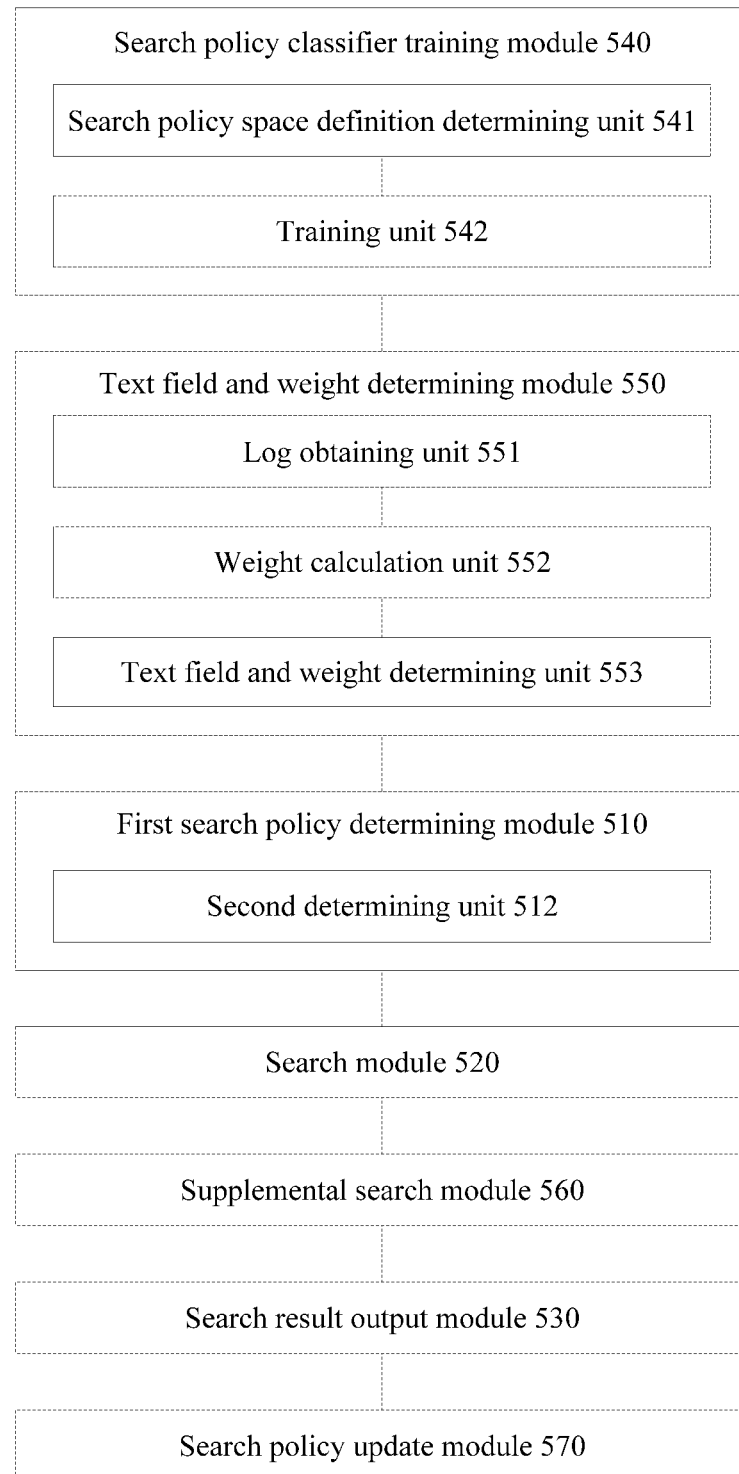
FIG. 8 is a functional block diagram of search logic according to yet another embodiment of the present disclosure.

In an embodiment, as shown in FIG. 8, the search logic further includes:

a supplemental search module 560, configured to perform the search operation for the query text based on a second search policy, where the second search policy corresponds to all second text index fields of a search material, and search weights of all the second text index fields are the same.

In an embodiment, as shown in FIG. 8, the search logic further includes:

a search policy update module 570, configured to: when a preset condition is satisfied, train and update, based on a search log corresponding to the second search policy, a classifier for identifying the first search policy.

In an embodiment, the preset condition includes at least one of the following: a preset update period is reached; and a ratio of a first click-through rate to a second click-through rate is less than a preset threshold, where the first click-through rate is a click-through rate of a search result obtained by performing a search operation based on the first search policy, and the second click-through rate is a click-through rate of a search result obtained by performing a search operation based on the second search policy.

Performing the search operation with reference to the second search policy can avoid recalling when there is no result due to missed detection. In addition, by repeatedly performing, with reference to the search result corresponding to the second search policy, the operation of training the classifier for identifying a first search policy, the problem that the first search policy is no longer appropriate due to a change in use habits of a user, and a new first search policy can be found in a timely manner.

The present disclosure further discloses a non-temporary computer-readable storage medium, storing a computer program, where when the program is executed by a processor, the steps of the search method in the foregoing embodiments are implemented.

The embodiments in this specification are all described in a progressive manner. Description of each of the embodiments focuses on differences from other embodiments. The embodiments are cross-referenced for the same or similar parts among the embodiments. An apparatus embodiment is basically similar to a method embodiment, and therefore is described briefly. For related parts, refer to partial descriptions in the method embodiment.

The search method and apparatus provided in the embodiments of the present disclosure are described in detail above. Specific examples are used in this specification to elaborate the principle and implementations of the present disclosure. The foregoing descriptions of the embodiments are only intended to help understand the method and core idea of the present disclosure. In addition, for a person of ordinary skill in the art, changes can be made on the specific implementations and application range according to the idea of the disclosure. In conclusion, the content of this specification should not be construed as a limitation on the present disclosure.

Selected Embodiments and Claim Concepts

This section describes additional aspects and features of search method, an apparatus and a non-temporary computer-readable storage medium, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below may expressly refer to and further limit other paragraphs, providing without limitation examples of some of the suitable combinations.

A0. A search method, comprising: determining at least one first search policy matching a to-be-searched query text, wherein each first search policy corresponds to at least one first text index field and a search weight matching the first text index field; performing a search operation for the query text based on each first text index field corresponding to each first search policy; and merging and outputting search results of all the search operations.

A1. The method of paragraph A0, wherein the determining at least one first search policy matching a to-be-searched query text comprises: determining the at least one first search policy matching the query text according to a preset corresponding relationship between first search policies and query texts.

A2. The method according to paragraph A0, wherein determining at least one first search policy matching a to-be-searched query text comprises: determining the at least one first search policy matching the query text by identifying the query text via a classifier pretrained for identifying each first search policy.

A3. The method according to paragraph A2, further comprising: training the classifier based on a search log.

A4. The method according to paragraph A3, wherein training the classifier based on a search log comprises: clustering the search log, and generating a search policy space definition, wherein the search policy space definition is used to represent a mapping relationship between each first search policy and a query text in the search log; obtaining the search log corresponding to each first search policy based on the search policy space definition; and training, based on the search log corresponding to each first search policy, a classifier for identifying the corresponding first search policy.

A5. The method according to paragraph A0, further comprising: determining the first text index field corresponding to each first search policy and a search weight matching the first text index field.

A6. The method according to paragraph A5, wherein the determining the first text index field corresponding to each first search policy and a search weight matching the first text index field comprises: obtaining a search log corresponding to the first search policy; performing an iterative calculation on an average weight of each second text index field corresponding to the first search policy according to a hit score of a query text in the search log corresponding to the first search policy in the second text index field in a search material; and determining the first text index field corresponding to the first search policy and the search weight matching the first text index field according to the average weight of the second text index field corresponding to the first search policy.

A7. The method according to paragraph A6, wherein performing the iterative calculation on an average weight of each second text index field corresponding to the first search policy according to a hit score of a query text in the search log corresponding to the first search policy in the second text index field in a search material comprises: obtaining a single log weight of each second text index field in each search log corresponding to the first search policy; and calculating the average weight of each second text index field corresponding to the first search policy based on the single log weight of the second text index field in each search log corresponding to the first search policy.

A8. The method according to paragraph A6, wherein determining the first text index field corresponding to the first search policy and the search weight matching the first text index field according to the average weight of the second text index field corresponding to the first search policy comprises: calculating a normalized weight value of each second text index field corresponding to the first search policy based on the average weight of the second text index field corresponding to the first search policy; determining the second text index field corresponding to the normalized weight value greater than a preset threshold as the first text index field corresponding to the first search policy; and determining the normalized weight value corresponding to the first text index field as the search weight matching the first text index field.

A9. The method according to paragraph A0, wherein performing the search operation for the query text based on each first text index field corresponding to each first search policy comprises: performing material recalling according to a correlation between content of each first text index field in a search material and the query text, wherein the correlation is determined based on the search weight of the first text index field.

A10. The method according to paragraph A0, further comprising: performing the search operation for the query text based on a second search policy, wherein the second search policy corresponds to all second text index fields of a search material, and search weights of all the second text index fields are the same.

A11. The method according to paragraph A10, further comprising: when a preset condition is satisfied, training and updating, based on a search log corresponding to the second search policy, a classifier for identifying the first search policy.

A12. The method according to paragraph A11, wherein the preset condition comprises at least one of the following: a preset update period is reached; and a ratio of a first click-through rate to a second click-through rate is less than a preset threshold, wherein the first click-through rate is a click-through rate of a search result obtained by performing a search operation based on the first search policy, and the second click-through rate is a click-through rate of a search result obtained by performing a search operation based on the second search policy.

B0. A search apparatus, comprising: a processor; and a non-temporary computer-readable storage medium, wherein the non-temporary computer-readable storage medium stores a machine executable instruction executable by the processor, and the machine executable instruction causes the processor to perform the search method according to any one of paragraphs A0-A12.

C0. A non-temporary computer-readable storage medium, storing a machine executable instruction, wherein when invoked and executed by a processor, and the machine executable instruction causes the processor to perform the search method according to any one of paragraphs A0-A12.

Through description of the foregoing implementations, a person skilled in the art can clearly learn that each implementation can be implemented by means of software in combination with a necessary universal hardware platform, and certainly, can be also implemented by using hardware. Based on such an understanding, the foregoing technical solutions essentially, or the part contributing to the prior art may be implemented in a form of a software product. The computer software product may be stored in a computer-readable storage medium, such as a ROM/RAM, a magnetic disk, or an optical disc, and includes several instructions for instructing a computer device (which may be a personal computer, a server, or a network device) to perform the methods described in the embodiments or some parts of the embodiments.

What is claimed is:

1. A search method, comprising:
    obtaining at least one first search policy matching a to-be-searched query text, wherein each of the at least one first search policy corresponds to at least one first text index field and a search weight matching the at least one first text index field;
    determining the at least one first text index field corresponding to the at least one first search policy and the search weight matching the first text index field, wherein the determining comprises:
        obtaining a search log corresponding to the at least one first search policy;
        performing an iterative calculation on an average weight of each second text index field corresponding to the at least one first search policy according to a hit score of a query text in the search log corresponding to the at least one first search policy in the second text index field in a search material;
        calculating a normalized weight value of each second text index field corresponding to the at least one first search policy based on the average weight of each second text index field corresponding to the at least one first search policy;
        assigning a respective second text index field with a respective normalized weight value greater than a preset threshold as the at least one first text index field corresponding to the at least one first search policy; and
        assigning a respective normalized weight value of the respective second text index field as the search weight matching the at least one first text index field;
    performing a search operation for the to-be-searched query text based on the retrieved at least one search policy, the at least one first text index field, and the determined search weight;
    performing a search operation for the to-be-searched query text based on a second search policy corresponding to all text index fields of the search material, wherein search weights of all the text index fields are identical; and
    merging and outputting search results of all the search operations.

2. The method according to claim 1, wherein the obtaining the at least one first search policy matching the to-be-searched query text comprises:
    determining the at least one first search policy matching the to-be-searched query text according to a relationship between first search policies and query texts; or
    determining the at least one first search policy matching the to-be-searched query text using a classifier pre-trained for identifying the at least one first search policy.

3. The method according to claim 2, further comprising: training the classifier based on the search log.

4. The method according to claim 3, wherein the training the classifier based on the search log comprises:
    clustering the search log, and generating a search policy space definition, wherein the search policy space definition is used to represent a mapping relationship between each first search policy and the query text in the search log;
    obtaining the search log corresponding to each first search policy based on the search policy space definition; and
    training, based on the search log corresponding to each first search policy, the classifier for identifying the at least one first search policy.

5. The method according to claim 1, wherein the performing the iterative calculation on the average weight of each second text index field corresponding to the at least one first search policy comprises:
    obtaining a single log weight of each second text index field in the search log corresponding to the at least one first search policy; and
    calculating the average weight of each second text index field corresponding to the at least one first search policy based on the single log weight of each second text index field in the search log.

6. The method according to claim 1, wherein the merging and outputting search results comprises:
    performing material recalling according to a correlation between content of the at least one first text index field in the search material and the to-be-searched query text, wherein the correlation is determined based on the search weight matching the at least one first text index field.

7. A search apparatus, comprising:
a processor; and
a non-temporary computer-readable storage medium, wherein
the non-temporary computer-readable storage medium stores a machine executable instruction executable by the processor, and the machine executable instruction causes the processor to perform the following operations:
    obtaining at least one first search policy matching a to-be-searched query text, wherein each of the at least one first search policy corresponds to at least one first text index field and a search weight matching the at least one first text index field;
    determining the at least one first text index field corresponding to the at least one first search policy and the search weight matching the first text index field, wherein the determining comprises:
        obtaining a search log corresponding to the at least one first search policy;
        performing an iterative calculation on an average weight of each second text index field corresponding to the at least one first search policy according to a hit score of a query text in the search log corresponding to the at least one first search policy in the second text index field in a search material;
        calculating a normalized weight value of each second text index field corresponding to the at least one first search policy based on the average weight of each second text index field corresponding to the at least one first search policy;
        assigning a respective second text index field with a respective normalized weight value greater than a preset threshold as the at least one first text index field corresponding to the at least one first search policy; and
        assigning a respective normalized weight value of the respective second text index field as the search weight matching the at least one first text index field;
    performing a search operation for the to-be-searched query text based on the retrieved at least one search policy, the at least one first text index field, and the determined search weight;
    performing a search operation for the to-be-searched query text based on a second search policy corresponding to all text index fields of the search material, wherein search weights of all the text index fields are identical; and
    merging and outputting search results of all the search operations.

8. The search apparatus according to claim 7, wherein the machine executable instruction further causes the processor to perform the following operation:
    determining the at least one first search policy matching the to-be-searched query text according to a relationship between first search policies and query texts; or
    determining the at least one first search policy matching the to-be-searched query text using a classifier pre-trained for identifying the at least one first search policy.

9. The search apparatus according to claim 8, wherein the machine executable instruction further causes the processor to perform the following operations:
    training the classifier based on the search log;
    clustering the search log, and generating a search policy space definition, wherein the search policy space definition is used to represent a mapping relationship between each first search policy and the query text in the search log;
    obtaining the search log corresponding to each first search policy based on the search policy space definition; and
    training, based on the search log corresponding to each first search policy, the classifier for identifying the at least one first search policy.

10. The search apparatus according to claim 7, wherein the machine executable instruction further causes the processor to perform the following operations:
    obtaining a single log weight of each second text index field in the search log corresponding to the at least one first search policy; and
    calculating the average weight of each second text index field corresponding to the at least one first search policy based on the single log weight of each second text index field in the search log.

11. The search apparatus according to claim 7, wherein the machine executable instruction further causes the processor to perform the following operation:
    performing material recalling according to a correlation between content of the at least one first text index field in the search material and the to-be-searched query text, wherein the correlation is determined based on the search weight matching the at least one first text index field.

12. A non-temporary computer-readable storage medium, storing a machine executable instruction, wherein when invoked and executed by a processor, causes the processor to perform actions of:
    obtaining at least one first search policy matching a to-be-searched query text, wherein each of the at least one first search policy corresponds to at least one first text index field and a search weight matching the at least one first text index field;
    determining the at least one first text index field corresponding to the at least one first search policy and the search weight matching the first text index field, wherein the determining comprises:
        obtaining a search log corresponding to the at least one first search policy;
        performing an iterative calculation on an average weight of each second text index field corresponding to the at least one first search policy according to a hit score of a query text in the search log corresponding to the at least one first search policy in the second text index field in a search material;
        calculating a normalized weight value of each second text index field corresponding to the at least one first search policy based on the average weight of each second text index field corresponding to the at least one first search policy;
        assigning a respective second text index field with a respective normalized weight value greater than a preset threshold as the at least one first text index field corresponding to the at least one first search policy; and
        assigning a respective normalized weight value of the respective second text index field as the search weight matching the at least one first text index field;
    performing a search operation for the to-be-searched query text based on the retrieved at least one search policy, the at least one first text index field, and the determined search weight;
    performing a search operation for the to-be-searched query text based on a second search policy corresponding to all text index fields of the search material, wherein search weights of all the text index fields are identical; and merging and outputting search results of all the search operations.

* * * * *